United States Patent [19]

Monzon et al.

[11] Patent Number: 4,806,207

[45] Date of Patent: Feb. 21, 1989

[54] STRUCTURED LATEX PARTICLES HAVING REINFORCING AND OPACITY CHARACTERISTICS

[75] Inventors: Medardo Monzon, Midland, Mich.; Michele R. Lock, Edgewater, N.J.; James G. Galloway, Midland, Mich.

[73] Assignee: The Dow Chemical Company, Midland, Mich.

[21] Appl. No.: 100,050

[22] Filed: Sep. 23, 1987

Related U.S. Application Data

[62] Division of Ser. No. 702,274, Feb. 15, 1987, abandoned.

[51] Int. Cl.[4] .......................... D21D 3/00; D21H 3/40
[52] U.S. Cl. .................................. 162/168.1; 162/169; 428/402
[58] Field of Search ..................... 162/169, 162, 168.1; 523/201; 428/407

[56] References Cited

U.S. PATENT DOCUMENTS

| | | | |
|---|---|---|---|
| 4,156,669 | 5/1979 | Lee | 260/29.7 |
| 4,178,205 | 12/1979 | Wessling et al. | 162/168.1 |
| 4,181,769 | 6/1980 | Plamondon et al. | 428/253 |
| 4,189,345 | 2/1980 | Foster | 162/168.1 |
| 4,264,678 | 4/1981 | Nelsen et al. | 428/407 |
| 4,537,916 | 8/1985 | Bruschtein et al. | 523/201 |
| 4,666,777 | 5/1987 | Ash et al. | 428/407 |
| 4,717,750 | 1/1988 | Makati et al. | 523/201 |
| 4,742,108 | 5/1988 | Makati et al. | 523/201 |

FOREIGN PATENT DOCUMENTS 1435821  5/1976  United Kingdom ............... 428/407

*Primary Examiner*—Sharon A. Gibson

[57] ABSTRACT

A paper product, especially light weight papers, is prepared with a structured latex particle having opacity and reinforcing characteristics comprising a core region having a light scattering characteristic and $T_g$ of about 80 degrees C or higher and a shell region of about 25 degrees C or lower. The structured latex particle provides opacity to the paper without adversely affecting its mechanical strength.

9 Claims, No Drawings

STRUCTURED LATEX PARTICLES HAVING REINFORCING AND OPACITY CHARACTERISTICS

CROSS-REFERENCE TO RELATED APPLICATION

This is a divisional, of application Ser. No. 702,274, filed 2/15/87 now abandoned.

BACKGROUND OF THE INVENTION

Generally, this invention is directed toward a method for preparing high quality lightweight paper having increased opacity. The method employs a structured latex having both reinforcing and opacifying characteristics.

In the manufacture of papers, especially lightweight paper, a major concern is the opacity of the paper. Generally, opacity is provided by conventional fillers such as clay, calcium carbonate and titanium dioxide. Unfortunately, these fillers can adversely affect the mechanical properties of the paper if too much filler is attempted to be incorporated to obtain the desired opacity.

Attempts have been made to offset the reduction in mechanical properties through the use of various formulations of latexes having increased strength. However, improved methods of obtaining good opacity or light scattering characteristics without reducing mechanical properties are continually being sought. The problem is difficult to solve because opacity and strength are generally inversely proportional characteristics. The problem is particularly acute in lightweight papers where the amount of material that can be employed to form the paper is minimal.

It has been discovered that by specifically engineering a structured latex particle having a core/shell morphology that both characteristics of opacity and mechanical strength can be satisfied. This is accomplished by preparing the latex particle such that it not only reinforces or binds the constituents of the paper but also scatters light to provide its own measure of opacity to the paper.

SUMMARY OF THE INVENTION

The present invention provides for a structured latex particle suitable for use in the preparation of latex containing products to increase opacity and strength comprising a core portion having a light scattering characteristic and a $T_g$ of about 80° C. or greater, and a shell portion having a $T_g$ of about 25° C. or lower. The structured latex particles have a particle size of about 1,400 to about 4,000 angstroms. In one embodiment the structured latex particle has a homopolymer core portion of styrene and a shell region of styrene/butadiene/acrylic acid.

The present invention further provides for a paper product prepared with the structured latex particle as described above. Most advantageously the latex particle is employed in the preparation of light weight paper where good opacity and mechanical strength are desired. The subject structured latex particle characteristically provides opacity and reinforcement which allows for the reduction of fillers, such as $TiO_2$, in the article of manufacture. That is, the structured latex particle allows for the reduction or elimination of expensive opacifying fillers in products without a corresponding loss of opacity.

DETAILED DESCRIPTION OF THE INVENTION

Preparation of the products of the present invention requires a starting latex comprising a structured latex particle having a core/shell morphology wherein the core region has a second order transition temperature ($T_g$) of about 80° C. or greater and the shell region has a $T_g$ of about 25° C. or lower. These structured latex particles are suitable for use in the preparation of paper products having good opacity and mechanical strength characteristics. Preferably and most advantageously, the subject latex is employed in the preparation of light weight papers where good opacity and mechanical strength are desired.

The term "opaque" is meant to define that quality of resisting the passage of light by being neither transparent nor translucent. The opaque characteristic is measurable by measuring the brightness of reflected light, light scattering or reflectance, and opacity (TAPPI standard T-425 om 81). By "mechanical strength" is meant the quality of tensile strength, modulus, tear strength, and other physical properties generally recognized in the art as contributing to mechanical strength.

The preparation of structured latexes are well documented and do not form a part of this invention except as modified by the compositional requirements of the invention. Generally, particles of a starting latex are encapsulated with additional monomers polymerized therewith. This can be conveniently accomplished by emulsion polymerizing the desired shell portion monomers in the presence of an existing latex which has the desired core composition. Thus, the polymerization is a conventional emulsion polymerization of a latex but for the polymerization of the shell monomer portion being conducted in the presence of a preexisting latex particle which represents the core region of the final latex product.

Emulsion polymerization techniques such as staged or continuous addition of monomer feeds are typically employed. Examples of such techniques are further described in U.S. Pat. Nos. 4,156,669 and 4,017,442, hereby incorporated by reference for their disclosure of polymerization techniques suitable for forming a core/shell structured latex particle.

The structured latex particle of the subject invention requires a core region which has light scattering properties. Generally, this light scattering characteristic is provided by a polymer or copolymer of ethylenically unsaturated monomers having a $T_g$ of about 80° C. or greater. The $T_g$ of the core region is important in maintaining the identity, i.e., size and distribution, of the core which thereby contributes to the light scattering characteristic of the latex. Contrarily a lower $T_g$ would allow the core region to coalesce during paper making and result in a low light scattering characteristic.

Difunctional monomers, typically useful a crosslinkers, can be employed in the core region to increase the $T_g$ of the core region. Examples of good crosslinkers would include allyl or crotyl acrylate and methacrylates, divinyl benzene and the like. The preferred polymer core composition is a monovinyl aromatic polymer such as styrene and copolymers or derivatives thereof having a $T_g$ of about 80° C. or greater. More preferably, the core region is a homopolymer of styrene.

The core portion of the structured latex particle comprises from about 40 to about 90 percent of the total particle. Preferably, the core/shell polymer weight ratio is from about 50/50 to about 90/10, respectively.

The particle size of the subject structured latex is important to the overall light scattering properties and, therefore, a particle size of from about 1,400 to about 4,000 angstroms (Å) is preferred. More preferably, the average particle diameter is from about 2,000 to about 3,500 Å.

The shell region of the subject structured latex particle is composed of a polymer or copolymer of ethylenically unsaturated monomers having a $T_g$ of about 25° C. or lower. Generally, the shell composition may include monomers employed in the core region. Thus, the shell compositions advantageously employed are various blends of polymerized monomers such as monovinyl aromat-ics, aliphatic conjugated dienes, monoethylenically unsaturated carboxylic acids, vinyl or vinylidene halides or acrylates. Optionally, reactive monomers such as N-methylolacrylamide and glycidilmethacrylate can be included.

The term "monovinyl aromatic monomer", as used herein, is meant to include those monomers with a radical of the formula

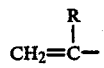

(wherein R is hydrogen or a lower alkyl such as an alkyl having from 1 to 4 carbon atoms) attached directly to an aromatic nucleus containing from 6 to 10 carbon atoms, including those wherein the aromatic nucleus is substituted with alkyl or halogen substituents. The preferred monomer is styrene.

The term "aliphatic conjugated diene", as used herein, is meant to include compounds such as 1,3-butadiene, 2-methyl-1,3-butadiene, 2,3-dimethyl-1,3-butadiene, 2-neopentyl-1,3-butadiene, piperylene (1,3-pentadiene), and other hydrocarbon analogs of 1,3-butadiene.

The term "monoethylenically unsaturated carboxylic acid monomer", as used herein, is meant to include those monocarboxylic monomers such as acrylic acid, and methacrylic acid; dicarboxylic monomers such as itaconic acid, fumaric acid, maleic acid, and their monoesters. The preferred acid monomer is acrylic acid.

Vinylidene halides and vinyl halides suitable for this invention include vinylidene chloride and vinyl chloride, which are preferred. Vinylidene bromides and vinyl bromide can also be employed.

The term "acrylate", as used herein, is meant to include monomers of the acrylate or methacrylate type. Additionally, the acrylates can include acids, esters, amides and substituted derivatives thereof. Generally, the preferred acrylates are $C_1$–$C_8$ alkyl acrylates or methacrylates. Examples of such acrylates include butyl acrylate, 4-biphenyl acrylate, hexyl acrylate, see, butyl acrylate, tert-butyl acrylate, methylmethacrylate, butylmethacrylate, lauryl methacrylate, hexylmethacrylate, isobutylmethacrylate, and isopropylmethacrylate.

The shell region is preferably composed of a polymer blend comprising styrene, butadiene and acrylic acid. This particular blend has been found to yield desirable physical properties and compatibility with the preferred core composition of styrene. Generally, the shell composition has the following styrene/butadiene/acrylic acid ratios 49/49/2 to 47/47/6; 49/49/2 to 69/29/2; and 69/29/2 to 67/27/6, respectively.

Structured latex particles prepared in the foregoing manner are advantageously employed as paper coatings or fillers where good opacity and mechanical properties are desirable. More particularly, paper products prepared with the subject structured particle latex will have increased opacity and strength over a similar paper prepared in the absence of the structured particle latex. While not limited to paper applications, the subject latex can also be employed as a filler or component in other areas where latexes may be employed such as in protective or decorative coatings, e.g., paints, etc. More advantageously, the subject structured latexes are employed as a latex binder or as a partial substitute for the latex binder in the preparation of high quality lightweight or fine papers. Lightweight papers are generally defined as those papers having less than 34 pounds/3300 sq.ft. or approximately 50 g/sq.meter.

These and other advantages will be readily apparent in view of the following examples.

EXAMPLE 1

A structured latex was prepared in the following manner. To about 80 parts by weight per 100 parts comonomer charge of an aqueous medium containing 0.01 part by weight of a pentasodium salt of diethylenetriaminepentacetic acid and 0.52 part by weight of a 97/3 weight ratio styrene/acrylic acid copolymer seed latex was continuously added 100 parts by weight of a styrene monomer feed with stirring over a period of 2.8 hours. An aqueous stream containing 40 parts deionized water, 1.0 part by weight of sodium dodecyldiphenyl ether disulfonate, 0.5 part by weight of sodium persulfate and 0.1 part by weight of sodium hydroxide was added with said styrene feed for a period of 4.5 hours at 90° C. Following the addition of the styrene feed a 49/49/2 weight ratio of styrene/butadiene/acrylic acid comonomer feed was continuously added with stirring over a 1.2 hour period. In addition, the comonomer feed also contained 0.15 part by weight of tertiary dodecylmercaptan.

Upon completion, the resulting latex had a total solids content of about 43 percent, a pH of 3, and the structured latex particles had an average particle diameter of about 1550 Å, and a polystyrene core ($T_g$ approximately 100° C.) to styrene/butadiene/acrylic acid shell ($T_g$ lower than 25° C.) ratio of 70/30.

EXAMPLE 2

A structured latex particle was prepared as in Example 1 except that the core/shell ratio was 50/50.

EXAMPLE 3

Paper compositions employing the latexes prepared in Examples 1 and 2 as reinforcing opacifiers were prepared. Seven and one-half parts (polymer solids basis) of the latexes from Examples 1 and 2 were admixed with individual samples of an aqueous paper composition. The paper composition consisted of 6,424 parts of an aqueous suspension containing 92.5 parts (dry weight basis) of bleached kraft wood fibers (50/50 dry weight ratio of hardwood/softwood), 100 parts of a 2 percent by weight aqueous solution of aluminum sulfate octadecehydrate, and 3.5 parts of 0.1 percent by weight aqueous solution of a high molecular weight polyacrylamide.

The suspensions described above were used to form paper handsheets having a basis weight of 40 lbs./3300 sq.ft. on a Noble and Wood paper machine. The structured particle latex content of each paper was measured by pyrolisis-gas chromatography. The opacity, brightness, tensile strength and elongation of the handsheets were measured and are shown below with a comparative paper example prepared as above except in the absence of the structured latex particles of this invention.

|  | Latex | | |
| --- | --- | --- | --- |
|  | None[1] | Example 1 | Example 2 |
| Core/Shell Ratio | — | 70/30 | 50/50 |
| Percent Latex | 0 | 3.9 | 4.87 |
| Opacity[2] | 73.4 | 76.6 | 74.3 |
| Brightness[3] | 77.4 | 79.9 | 78.4 |
| Tensile (psi) | 3373 | 3566 | 3579 |
| Elongation (%) | 2.6 | 2.7 | 2.8 |
| Scattering[4] (cm$^2$/g) | 302 | 1491 | 544 |

[1] Not an example of the invention; conventional paper sheet
[2] Opacity is TAPPI standard T-425 om 81
[3] Brightness is TAPPI standard T-452 om 83
[4] Scattering coefficients obtained from reflectance measurements (Kubelka-Munk equation).

The results indicate that just a small addition of the subject structured latex particle increased the opacity without a reduction in strength, in fact increasing the strength, of the paper sheet over the comparative paper sheet containing no structured latex particle. This result is significant inasmuch as opacity and strength are generally inversely proportional characteristics. It is indicated that further improvement in properties would be observed at higher levels of the subject latex inclusion; however, this would tend to increase the overall cost of the paper. Generally, the subject latex can comprise from about 1 to about 20 percent by dry weight basis of the paper composition. Preferably, the latex content of the paper is from about 2 to about 10 percent by weight.

What is claimed is:

1. A light weight paper product containing a structured latex particle comprising:
   (1) a core portion having a light scattering characteristic and a $T_g$ of about 80° C. or greater;
   (2) a shell portion having a $T_g$ of about 25° C. or lower;
   whereby the opacity and strength of said paper is increased over a paper product prepared in the absence of said structured latex particle.

2. The paper product of claim 1 wherein the structured latex particle comprises from about 1 to about 20 percent by dry weight of said paper.

3. The paper product of claim 1 wherein said core portion comprises a monovinyl aromatic polymer, copolymer or derivative thereof.

4. The paper product of claim 3 where said monovinyl aromatic polymer is styrene.

5. The paper product of claim 1 where said structured particle latex has a homopolymer core region of styrene.

6. The paper product of claim 3 where said core portion additionally contains difunctional monomers which contribute to increasing the $T_g$ of said core.

7. The paper product of claim 6 where said difunctional monomer comprises allyl or crotyl acrylates, and/or methacrylates, or divinyl benzene.

8. The paper product of claim 1 where said structured particle latex has a shell region comprising a polymer blend of styrene/butadiene/acrylic acid.

9. The paper product of claim 8 where the ratio of said styrene/butadiene/acrylic acid is 49/49/2 to 47/47/6; 49/49/2 to 69/29/2; and 69/29/2 to 67/27/6, respectively.

* * * * *